Nov. 20, 1923.

D. MALONEY

METHOD OF AND APPARATUS FOR TREATING COTTON SEED

Filed Nov. 10, 1921   2 Sheets-Sheet 1

1,474,374

Inventor
Daniel Maloney
By Staley Bowman
Attorneys

Nov. 20, 1923.  1,474,374
D. MALONEY
METHOD OF AND APPARATUS FOR TREATING COTTON SEED
Filed Nov. 10, 1921 2 Sheets-Sheet 2
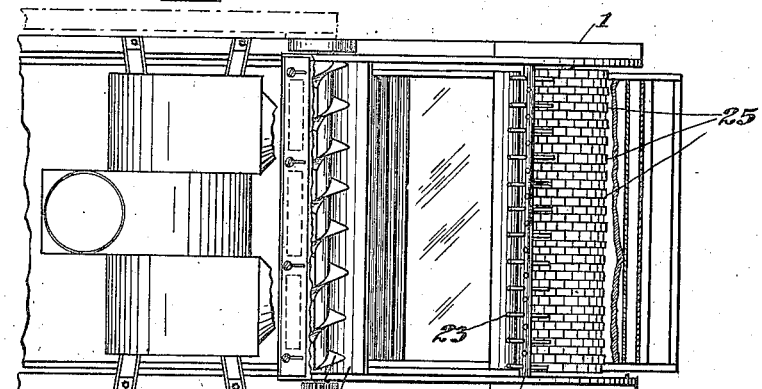
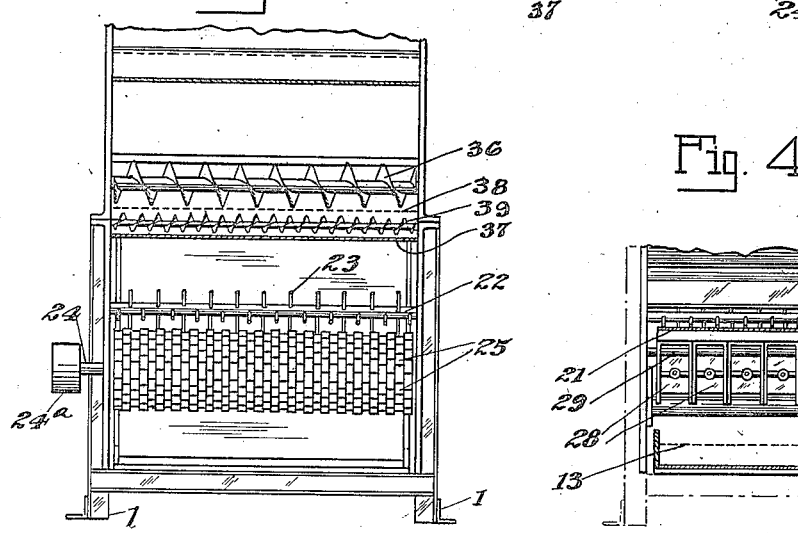
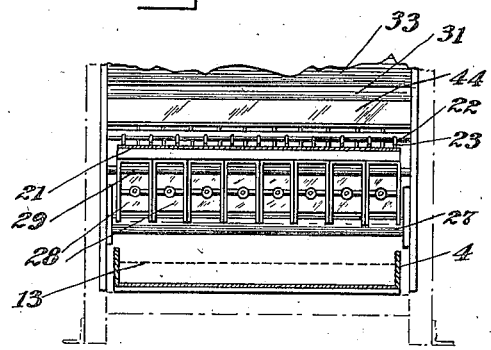

Patented Nov. 20, 1923.

1,474,374

UNITED STATES PATENT OFFICE.

DANIEL MALONEY, OF SPRINGFIELD, OHIO, ASSIGNOR TO THE BAUER BROTHERS COMPANY, OF SPRINGFIELD, OHIO, A CORPORATION OF OHIO.

METHOD OF AND APPARATUS FOR TREATING COTTON SEED.

Application filed November 10, 1921. Serial No. 514,376.

*To all whom it may concern:*

Be it known that I, DANIEL MALONEY, a citizen of the United States, residing at Springfield, in the county of Clark and State of Ohio, have invented certain new and useful Improvements in Methods of and Apparatus for Treating Cotton Seed, of which the following is a specification.

This invention relates to a method of and apparatus for treating cotton seed for the purpose of separating the meats from the hulls and also for separating the uncut seed from the hulls after the crushed seed have been subjected to the primary separating operation.

In the process of separating the meats from the hulls of cotton seed, it is desirable to crush the seed more or less coarsely to facilitate the separation, as a result of which more or less of uncut seed will pass through the crusher, or huller as it is called, and mingle with the crushed seed. In order to salvage this uncut seed and convey it back to the huller for regrinding or crushing, means having been provided for separating the same from the hulls after the major portion of the meats have been claimed, and one of the objects of the present invention is to provide improved means for accomplishing this result.

A further object of the invention is to also provide improved means for separating from the hulls and uncut seed those particles of meats which have escaped the primary separation.

In the accompanying drawings:—

Fig. 2 is a section on the line 2—2 of Fig. 1.

Fig. 3 is an end elevation with the casing and deflector plate removed.

Fig. 4 is a section on the line 4—4 of Fig. 1.

Figure 1:
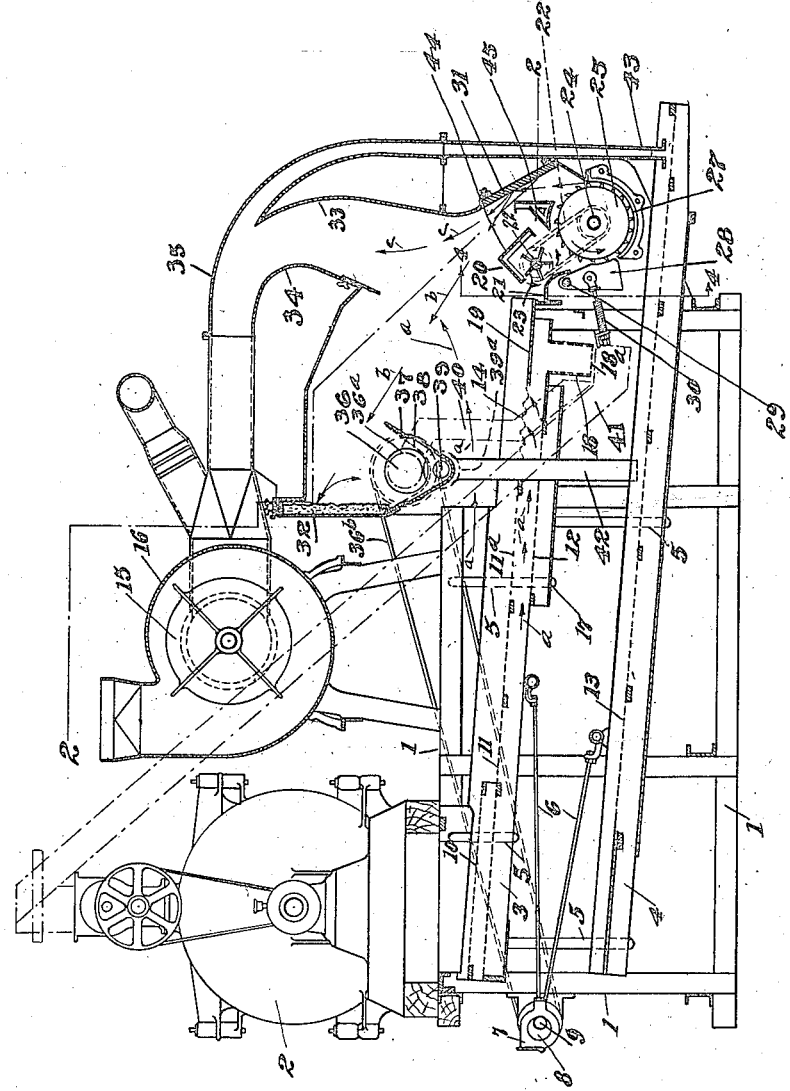
Fig. 1 is a longitudinal sectional view of an apparatus embodying my improvements.

Referring to the drawings, 1 represents a main supporting frame at one end of which is mounted a huller 2 of a well known type, such as the one illustrated in Letters Patent No. 1,349,034 dated August 10, 1920. Mounted to oscillate in the frame 1 are two shaker frames 3 and 4, these frames being hung from pivoted hangers 5 and connected by pitmen 6 with the straps 7 of eccentrics 8 on the shaft 9 in a well known way. The upper shaker 3 has a spreader section 10 formed of perforated sheet metal arranged just beneath the discharged mouth of the huller 2, and also a perforated screen 11 which receives at its upper end the crushed seeds from the spreader. The major portions of the meats will pass through the upper half of the screen 11 and drop onto the screen 13 of the lower shaker 4, the perforations of the upper portion of the screen 11 being of a sufficient fineness to prevent the passage of the uncut seed and hulls. The uncut seed and hulls, together with a certain proportion of the meats, ride down the screen 11 until they reach a part thereof indicated at 11$^a$ in which the perforations are somewhat larger, which allows the heavier uncut seed which naturally ride at the bottom of the mass to pass through, together with some meats, to a perforated metal screen 12 carried by the shaker frame 3, which constitutes a sub-shaker. The separation of the uncut seed at the point 11$^a$ of the screen 11 constitutes the first separation of the uncut seed, this separation being brought about by the difference in weight of the uncut seed and the shaking action. It will be understood that the perforations in the part 11$^a$ are small enough to prevent passage therethrough of any considerable portions of the hulls, only the finer particles of hulls finding their way with the uncut seed through this perforated part 11$^a$. This separation constitutes purely a scalping operation resulting in scalping off or separating some of the heavier seeds which are on the bottom of the mass.

Immediately following the perforated portion 11$^a$ is another screen section 14 of a corrugated or wavy character, the perforations being of a nature to permit certain of the uncut seeds and some meats to fall through to the screen 12. A current of air induced by the suction fan 15, located in the casing 16, passes through the screen 14 at an acute angle to the direction of travel of the material, as indicated by the arrows $a$, which has the effect of buoying up the hulls on this screen 14, which facilitates the passage of the seed and meats which are heavier than the hulls through the perforations in the screen 14. The wavy character of the screen 14 gives a vigorous disintegrating action to the hulls buoyed up by the air and aids materially in jarring out the uncut seeds and meats therefrom. This wavy character of the metal also retards to some extent the passage of the hulls and prevents the air current from throwing the hulls into the beater to be discharged in large masses.

The meats which fall upon the screen 12 are permitted to pass therethrough onto the imperforated section 17 of the subshaker and from there drop onto the section 13 of the lower shaker along with the other meats. The uncut seeds which drop through onto the section 12 are prevented from passing therethrough because of the size of the perforations and are deposited onto a side shaker 18, having a perforated bottom 18$^a$, connected with the main shaker frame 3, and are discharged thereby to the side of the machine.

The material which passes from the screen section 14 consists chiefly of hulls together with some meats and uncut seed which later are imprisoned in woolly mats of hulls and have not been freed by the shaking action or by the buoying action of the air. This material after passing over the imperforated section 19 at the extreme lower end of the shaker 3 drops into a throat formed by an inclined upper wall 20 and a lower wall 21, where it is acted upon by a beater located in the throat and thoroughly disintegrated or torn apart thereby. This beater consists of a shaft 22 having a plurality of pegs or fingers 23, the shaft being revolved in the direction of the arrow shown in Fig. 1, by a belt 22$^a$ from the shaft 24 of a drum to be described.

From the beater the material passes to an accelerating drum which revolves in the direction of the arrow shown in Fig. 1. This drum is constructed of a series of toothed disks 25 which disks are clamped together upon the shaft 24 so as to rotate therewith. The lower side of the drum is enclosed by a wall 27 arranged in close proximity to the teeth and a series of gates 28 pivoted to a shaft 29 and normally pressed toward the drum by springs 30, are provided to regulate the feed of the material to the drum and to prevent clogging, and to permit the discharge of foreign material.

The accelerating drum is revolved by power applied to the pulley 24$^n$ at a comparatively high rate of speed and acts to further disintegrate or tear apart the material and then discharge the material in a finely subdivided state at a definite velocity along a definite line against a polished rigid metal deflector 31. This deflector is suitably supported from the walls of the structure and is inclined inwardly and upwardly so that the material from the accelerating drum will strike the same at an angle and be bounced off or deflected therefrom at a comparatively great angle, almost the same as the angle of incidence. The meats and uncut seed are deflected at the greater angle, however, as shown by the arrows $b$ and are thrown across a passageway through which the current of air induced by the fan 15 circulates and are thrown against a cushion or mat 32 to prevent the seed material from rebounding. The hulls, however, are deflected at a lesser angle as shown by arrows $c$ and are picked up by the current of air, which carries the hulls through a chute formed by the walls 33, 34 and 35 where they are conveyed to a suitable point of discharge. The air current is just strong enough to pick up the hulls and not interfere with the heavier particles of uncut seeds and meats. Any uncut seed which fails to be properly deflected will drop back onto the upper shaker frame or into the throats formed by the walls 20, 44 and 45 and thereby be again conveyed to the accelerator.

The uncut seed and meats after striking the soft mat drop onto a screw conveyor 36 arranged in a trough 37, there being a screen 38 just beneath the conveyor 36 and a second smaller screw conveyor 39 beneath the screen. This screen 38 permits the small particles of meats to pass therethrough onto the conveyor 39. The conveyors are geared together by the gears 36$^a$ and 39$^a$ and driven from the shaft 9 by the belt 36$^b$. The conveyor 36 conveys the uncut seed to the side of the machine where they are deposited into a trough shown in dotted lines at 40 and conveyed to the lower end of an elevator 41, also shown in dotted lines, and thereby carried, together with the uncut seed which have dropped upon the shaker 18, back to the huller 2. The small particles of meat will be conveyed to the trough 42 and dropped onto the screen 13 with the other meats.

Lint and fine hulls are removed from the meats on the lower shaker by an air suction through the conduit 43 in the rear wall.

Having thus described my invention, I claim:—

1. The method of treating seed consisting in subjecting the cut material to an initial operation to separate the meats from the hulls and uncut seed, and then projecting the hulls and uncut seed in an unsupported condition across an air current of sufficient strength to carry the hulls therewith but permit the seed to follow substantially the course of their projection.

2. The method of treating seed consisting in subjecting the cut material to an initial operation to separate the meats from the hulls and uncut seed, and subjecting the uncut seed and hulls to an accelerating action, and deflecting the accelerated material across an air current of sufficient strength to carry therewith the hulls but permit the uncut seed to follow the course of their deflection.

3. The method of treating seed consisting in subjecting the cut material to an initial operation to separate the meats from the hulls and uncut seed, subjecting the hulls and uncut seed to a disintegrating action, accelerating the material, and deflecting the same across an air current to cause the hulls to be carried away from the seeds.

4. The method of treating seed by subjecting the cut material to an initial shaking and screening operation, then subjecting a part of the cut material, consisting of the hulls and uncut seed, to a mechanically driven accelerating device while restraining the material from scattering, and then projecting same across an air current to carry the hulls from the seeds.

5. The method of treating seed by subjecting the cut material to an initial shaking and screening operation to separate the meats from the hulls and uncut seed, then subjecting the uncut seed and hulls to a mechanically driven accelerating device, while restraining the material from scattering, and thereafter deflecting the material, some in one path and others in a different path across an air current sufficient to carry the hulls from the deflected mass.

6. The method of treating seed consisting in subjecting the cut material to an initial operation to separate the meats from the hull and uncut seed, subjecting the hulls and uncut seed to a disintegrating action, then accelerating the material and deflecting the same across an air current to cause the hulls to be carried away from the seeds.

7. The method of treating seed consisting in subjecting the cut material to an initial operation to separate the majority of the meats from the hulls and uncut seed, then deflecting the hulls, uncut seed and remainder of the meats across an air current to separate the hulls from the seeds and meats, then arresting the course of the seeds and meats and separating the same by a screening action.

8. The method of treating seed consisting in subjecting the cut material to an initial operation to separate the majority of the meats from the hulls and uncut seed, then subjecting the hulls, uncut seed and remainder of the meats to an accelerating action, deflecting the accelerated material across an air current to separate the hulls from the seeds and meats, and then arresting the course of the seeds and meats and separating the same by a screening action.

9. The method of treating seed consisting in subjecting the cut material to an initial operation to separate the majority of the meats from the hulls and uncut seed, then subjecting the hulls, uncut seed and remainder of the meats to a disintegrating action, then accelerating the material and deflecting the same across an air current to cause the hulls to be carried away from the seeds and meats, and arresting the course of the seeds and meats and separating the same by a screening action.

10. The method of treating seed consisting in subjecting the cut material to an initial shaking and screening operation to separate the majority of the meats from the hulls and uncut seed, subjecting the uncut seed, hulls and remainder of the meats to an accelerating action, deflecting the accelerated material across an air current to remove the hulls, and arresting the course of the seeds and meats and separating the same by a screening action.

11. The method of treating seed consisting in subjecting the cut material to a shaking and screening operation to separate the majority of the meats from the hulls and uncut seed, subjecting the hulls, uncut seed and remainder of the meats to a disintegrating action, accelerating the material and deflecting the same across an air current to remove the hulls from the seeds and meats, and then arresting the course of the seeds and meats and separating the same by a screening action.

12. The method of treating substances consisting of heavy and light particles mixed together by first subjecting said mixed substances to an accelerating device while confining same in a narrow stream, thereafter impelling same by impact to cause the particles to rebound in an unsupported condition and while in that condition subjecting same to an air current whereby the lighter particles will be separated from the heavier ones.

13. The method of treating substances consisting of heavy and light particles mixed together by first subjecting said mixed substances to an accelerating device while confining same in a narrow stream, thereafter impelling same by impact to cause the particles to rebound in an unsupported condition, some particles pursuing a different path from the others, and while in that condition subjecting same to an air current whereby the particles in the path of movement nearest the air current will be separated from the other particles.

14. In an apparatus for treating seed, devices for initially separating the meats from the hulls and uncut seed, means for accelerating the movement of the hulls and uncut seed while restraining same from scattering, means for impelling said material in a plurality of streams across an air current to remove the hulls being impelled in a separate stream from the uncut seed, and means for arresting the course of the seeds and permitting them to fall into the conveyor.

15. In an apparatus for treating seed, devices for separating the meats from the hull and uncut seed, means for accelerating the movement of the hulls and uncut seed, means for creating a current of air across the path of movement of the hulls and seed to separate the hulls from the seed, and a cushion for arresting said seed.

16. In an apparatus for treating seed, devices for separating the meats from the hulls and uncut seed, a disintegrator for the hulls and seed, an accelerator to receive the hulls and seeds from said disintegrator, and means for creating an air current across the path of movement of said material to separate the hulls from the seed.

17. The method of treating substances consisting of heavy and light particles mixed together by subjecting said substances to an accelerating action while restraining same from scattering and thereby projecting in a thin stream or sheet the same across an air current in an unsupported condition whereby the lighter particles will be separated from the heavier.

18. In an apparatus of the character described, means for producing an air current, and an accelerating device arranged to receive a substance composed of a mixture of heavy and light particles and accelerate the movement thereof while restraining same from scattering and project the same in a plurality of streams or sheets across the air current in an unsupported condition, for the purpose specified.

In testimony whereof, I have hereunto set my hand this 5th day of September, 1921.

DANIEL MALONEY.